United States Patent [19]

Zielke

[11] 4,140,883

[45] Feb. 20, 1979

[54] KEYBOARD WITH SELECTIVE KEY ENTRY BLOCK

[75] Inventor: Alfred Zielke, Peine-Vöhrum, Fed. Rep. of Germany

[73] Assignee: Elmeg-Elecktro-Mechanik, Peine, Fed. Rep. of Germany

[21] Appl. No.: 845,718

[22] Filed: Oct. 26, 1977

[30] Foreign Application Priority Data

Oct. 27, 1976 [DE] Fed. Rep. of Germany ....... 2648679

[51] Int. Cl.[2] .............................................. H04M 1/66

[52] U.S. Cl. ............................. 179/90 D; 179/189 D; 200/5 EA; 340/365 R

[58] Field of Search ............ 179/90 D, 189 R, 189 D, 179/90 K, 180 A; 200/5 R, 5 E, 5 EA, 5 B, 5 C, 153 R, 159 R; 340/365 R

[56] References Cited

U.S. PATENT DOCUMENTS

| | | | |
|---|---|---|---|
| 679,310 | 7/1901 | Hall | 200/5 EA |
| 3,470,322 | 9/1969 | Milner et al. | 200/5 EA |
| 3,551,611 | 12/1970 | Fechner | 200/5 EA |
| 3,845,255 | 10/1974 | Zielke | 200/5 EA |
| 3,903,381 | 9/1975 | Diehr | 200/5 EA |
| 4,022,992 | 5/1977 | Kennedy | 179/189 D |

*Primary Examiner*—Kathleen H. Claffy
*Assistant Examiner*—Gerald L. Brigance
*Attorney, Agent, or Firm*—Smyth, Pavitt, Siegemund, Jones & Martella

[57] ABSTRACT

Particular keys are provided with locking arms that may or may not enter a duct filled with balls and being displaceable in the duct only if a locking element is not inserted. That element will be inserted when keys having said locking arms must not be depressed. The locking element is either electromagnetically or mechanically actuated, particularly for retracting it when the lock is to be released, e.g., following actuation of a legal key. The arrangement is explained with reference to a telephone in which handset lifting and replacing perform initialization and/or restauring functions. The unlocking may be initiated by pressing a legal key having actuation arms which will displace balls in another duct for displacing a pin which controls the actuator. That second duct with balls serves also as a lock against dual key depressing.

15 Claims, 8 Drawing Figures

(A - B)

KEYBOARD WITH SELECTIVE KEY ENTRY BLOCK

BACKGROUND OF THE INVENTION

The present invention relates to improvements in keyboards and is particularly concerned with a device which prevents particular keys from being depressed as the first one (or another one) within a series of key depressions.

In certain instances it is desired, for example, that a telephone (with a push button keyboard) can be used to dial, e.g. local numbers only or can be used in-house only and not for dialing out. This result can be achieved by blocking the depression of certain keys, e.g. as first ones. For example, in Europe, long distances calls must begin always by dialing a zero as the first digit. Blocking the depression of the zero key as long as no other key has been depressed first, effectively inhibits the making of long distance calls. In some parts of the USA, long distance calls have to be preceded by dialing a "1". In other parts a long distance call can be recognized in that the second dialed digit is either a "1" or a "0". In other cases, (hotels, offices) dialing out is preceded, e.g. by dialing a 9. If such a dial out is to be prevented, e.g. from certain phones, the first dialing of a 9 must be inhibited.

Inhibiting the depressing of particular keys as first ones being depressed in a sequence of key depressions is not known up to now, but in the field of telephone interconnections it is already known for a long time to block certain lines of communication if there is dialed a zero as the first digit. This blocking is achieved by providing a counter counting the dial pulses which energizes a blocking relay blocking the connection to the calling telephone set if the number of the first dial pulses correspond to dialing a zero. This known arrangement is expensive and not safe against overcoming the blocking.

DESCRIPTION OF THE INVENTION

It is an object of the present invention to improve keyboards and to provide for blocking of particular keys which should not be pressed in a particular digit position of a multi-digit number, such as a first digit thereof.

In accordance with the preferred embodiment of the invention, it is suggested to provide a duct filled with displacement bodies such as balls, cylinders or the like, which are permitted to undergo limited displacement in the duct. The displacement of these bodies is entirely blocked by a retractable locking or blocking element inserted in the duct when the particular key depression lock is to take place. These particular keys are provided with blocking arms which, upon pressing the key, are placed into the duct provided, however, the blocking or locking element is not inserted, otherwise the particular keys cannot be depressed. In addition, the device is provided with a transfer means which is responsive to the depression of any of the other keys while the locking element is inserted, and to cause an actuator to retract the locking element so that thereafter any of the keys can be depressed.

It should be noted that once the keyboard is provided with the basic structure, any key can be selected to become a blocked one simply by providing it with such a blocking arm.

The actuator may be an electromagnetic device or a mechanical device. In the former case, keying-in of a "legal" first digit causes a circuit to particularly energize the electromagnetic device to retract the locking element. In the case of a mechanical device, pressing of a "legal" key mechanically retracts the locking element. The pressing of a legal key requires a transfer means to cause the actuator to respond. It is suggested to use here a second, similar duct with displacement bodies being displaceable by either key (at least by the "legal" ones) and operating a pin. That pin carries out switching operations in the case of an electromagnetic actuator device, or its physical movement is mechanically linked to the locking element. The two ducts may, for example, be U-shaped, if the keyboard has four columns of keys, and the legs of the U's extend between respective two such columns. The first duct has preferably a slot in the bottom of the U through which the locking element can be inserted in a point of symmetry of the U. The second duct has preferably the actuator pin provided at the end of one leg of the U. All keys have arms that may extend into the second duct for purposes of operating the pin, though, only the legal keys need to have such arms. However, this second duct may also function as a lock to prevent simoultaneous depressing of two keys.

The interrelation between the transfer means, the actuation means, and the locking element, can be realized in two different ways. In one instance the locking element is inserted for a resting or neutral position of the actuator; in the other instance, the locking element is retracted in the neutral or resting position. In the first instance, the transfer means actuates the actuator, in the second instance the actuator is deactivated, requiring a preparatory or initialization step that activates the actuator prior to first key depression. Generally speaking, lifting the handset off the telephone cradle, serves as, or as part of the initialization step.

In the case of an electromagnetic actuator, one will preferably chose the second principle in which the locking element is normally retracted, but is inserted following lifting the receiver off the hook. The actuator may be operated by a capacitor which discharges in one direction prior to first key pressing and in the opposite direction upon pressing a first legal key. The capacitor may be charged when the receiver is lifted and discharged for the first time when an enabling switch for this particular phone, being, for example, an extension phone, is activated. This discharge provides a pulse to the actuator, to cause the locking element to be inserted. The capacitor will be recharged thereafter and following the first key-in, the capacitor will be discharged in the opposite direction to cause the electromagnetic actuator to retract the locking element. The electromagnetic actuator should be constructed as a bistable device, so that it will not draw permanently current in either position.

In the case of mechanical actuator, one will preferably chose the first principle (normally inserted locking element), and through mechanical linkage a first legal key depression causes the locking element to be retracted and to be held in the retracted position until being released, for example, when the cradle is depressed. The linkage may include a slide which is latched into the locking element retracting position, such latching being possible only when the handset is lifted, and upon replacing the handset, the latch releases the slide to re-insert the locking element.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
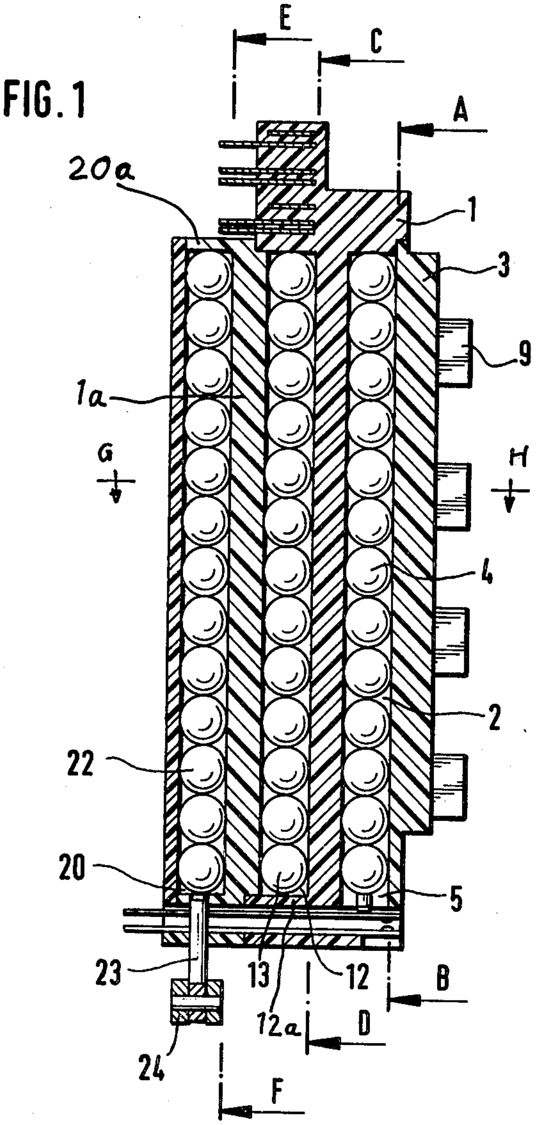
FIG. 1 is a cross-section of a keyboard in accordance with the preferred embodiment of the present invention, using an electromagnetic actuating device for operating a locking pin.

Proceeding now to the detailed description of the drawings, the keyboard illustrated has a base plate 1 whose upper part is provided with grooves 2 which extend as per plane A, B in FIG. 1, in longitudinal (columns) as well as in transverse (row) directions, corresponding to a two-dimensional array and, of course, the two sets of grooves form a plurality of matrix-like intersections.

The grooves 2 are filled with displacement bodies, such as balls 4 of which adjacent ones engage each other in surface to surface contact. However, the one end of each row and of each column, is provided with a small displacement space 5 which is bridged in each instance by an actuator pin 6 engaging the first ball in the respective row. The other end of each such pin is operatively coupled to a set of contacts 7. Displacement of the pin operates the respective contact. Keyboards with key actuation of this type are known per se, see for example U.S. Pat. No. 3,845,255.

The grooves 2 leave shallow islands such as 1' inbetween which have a height that is lower than the ball diameter but sufficient to retain the balls in the grooves permitting them to be displaced only in the respective groove to the extent the spaces 5 permit such displacement.

Figure 2:
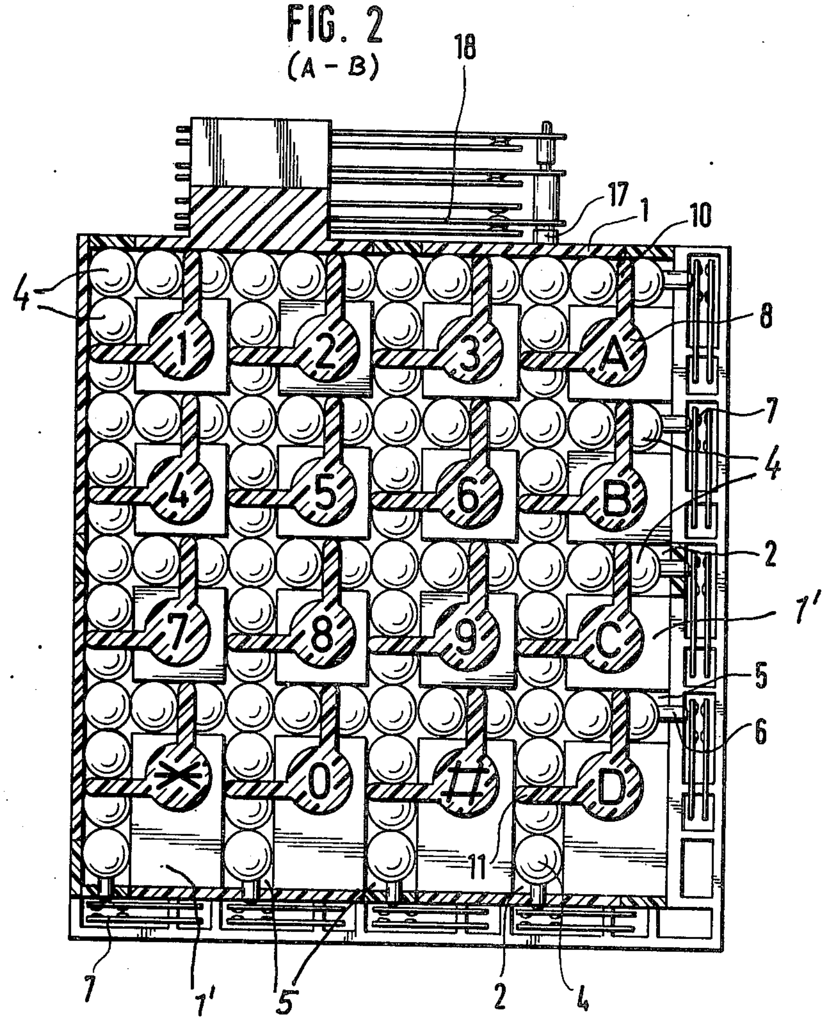
FIGS. 2, 3 and 4 are longitudinal sections through such a keyboard as indicated, respectively, by lines A, B (FIG. 2); C, D (FIG. 3), and E, F (FIG. 4)

The plate 1, and here particularly the islands 1', are provided with cylindrical bores which receive cylindrical plungers 8. Plate 1 is covered by a panel 3 which is provided with bores receiving also the plungers 8, each of which carrying a keyboard button or key 9, which is accessible from the front of panel 3. The plungers 8 as shown in FIG. 2, are additionally provided with digit labels 0 to 9, and characters A, B, C, D, *, and #, which are not reference numerals but identify the significance of the keyboard keys. As well be described more fully below, each plunger 8 has a hollow extension 8' which extends beyond plate 1, through the planes C, D and E, F, and is, therefore, shown also in FIGS. 3 and 4. The keyboard digits and characters have also been drawn onto the plungers in FIG. 4.

Each plunger 8 has two arms or tongues 10 and 11 which extend therefrom and at right angles to each other, radially away from the plunger. Each arm has a lug that reaches deeper into the groove towards and above which the arms extends. These lugs extend axially as far as the respective plunger axis is concerned. Alternatively, each of the islands 1' may be provided with two lateral slots for, respectively, receiving the arms 10, 11, and interconnecting in effect the groove spaces with the bore in the island receiving the plunger. In either case, upon depressing a keyboard button or key 9, the arms 10 and 11 place themselves inbetween respective two balls 4 in a row and inbetween two balls in a column, displacing all those balls on the side leading towards a displacement space and pin 6. Accordingly, the pins 6 of the particular row and of the particular column are being displaced and actuate the respective contacts 7.

The other side of plate 1 is provided with a U-shaped duct structure 12 in a frame **12*a* which is integral with plate 1. This duct is visible best in FIG. 3 and it can be seen that it is closed at both ends of the two legs of the U. The duct is almost completely filled with balls 13, leaving just a small displacement space 14 at one end. The frame 12*a* has a bore 16 adjacent to that end which receives a pin or plunger 17** engaging the balls so that the last one in the other U-leg abuts the end thereof.

The duct is disposed to pass along all sixteen plungers 8'. This is true on a general basis; the single duct 12 is to have the configuration in that it passes along all keyboard plungers. Each plunger 8' has another arm 15 projecting through a slot in duct 12, and upon depressing a plunger 8' the respective arm 15 is placed inbetween two balls 13, whereby the plunger or pin 17 is lifted. Please note that but one arm 15 at a time can be so placed. A second plunger 8' cannot be depressed. Thus, the duct 12 with balls 13 fulfills two functions. One is a blocking function which prevents two board keys to be depressed at the same time; the other one is an operative function, in that the resulting displacement of some of the balls 13 lifts plunger 17, which, in turn, operates a set of contacts 18, 18'. As will be described more fully below, and in connection with the alternative embodiment, the ball displacement may carry out an alternative function, namely operating a mechanical lock (lever 19, FIG. 6) rather than switches. This second (or the alternative) function can also be interpreted as a function of a transfer means in that the displacement of pin or plunger 17 signals that a key has been depressed.

The frame **12*a* carries another plate 1*a* which, together with plate 1, defines a housing that contains duct 12. Plate 1*a*, in turn, has a frame part 20*a* which contains another U-shaped duct 20 which is aligned with duct 12 (see also FIG. 4). Duct 20 has both leg ends closed and is filled with displacement bodies, such as balls 22, leaving also here just a small displacement space 21. Of course, that displacement space may appear elsewhere, but it is shown here as the result of insertion of a locking or blocking pin 23. The pin 23 is the principle blocking element which can be inserted into the duct 20 to prevent any further displacement of the balls 22. Upon retraction of blocking element 23, the balls 22** can undergo a limited displacement.

The locking pin 23 is pivotally linked to a pivot type armature 24 of a bipolar (bistable) electromagnetic actuator or relay 25. The relay 25 is of a construction as is basically known. It has a yoke structure 26 and 27 which include two pole shoes each, respectively, adjacent to the two ends of the armature. The yoke structure is permanently biased by means of permanent magnets so that each of the two possible armature positions is a stable one. The relay 25 includes further a coil 28 looping around the armature.

The duct 20 passes along all of the plungers 8'. Those keys which are to be prevented from being pressed in a particular position of a multi-digit number to be keyed-in, for example as first ones of that number, are provided with arms 33. In the illustrated example, the keys for digits 0, 1 and 9 are provided with such blocking or inhibiting arms. Whenever the blocking pin 23 is inserted in the duct 20, these keys cannot be pressed because the respective arms 33 are stopped by the immobilized or presently undisplaceable balls 22. The other keys can readily be depressed irrespectively of the position of the pin 23. It should be noted further that this blocking of the pressing of certain keys is independent from the particular mode and manner of actuating pin 23. Moreover, pin 23 can be inserted and retracted from the blocking position in any phase of the operating, depending upon particulars of its control.

Figure 3:
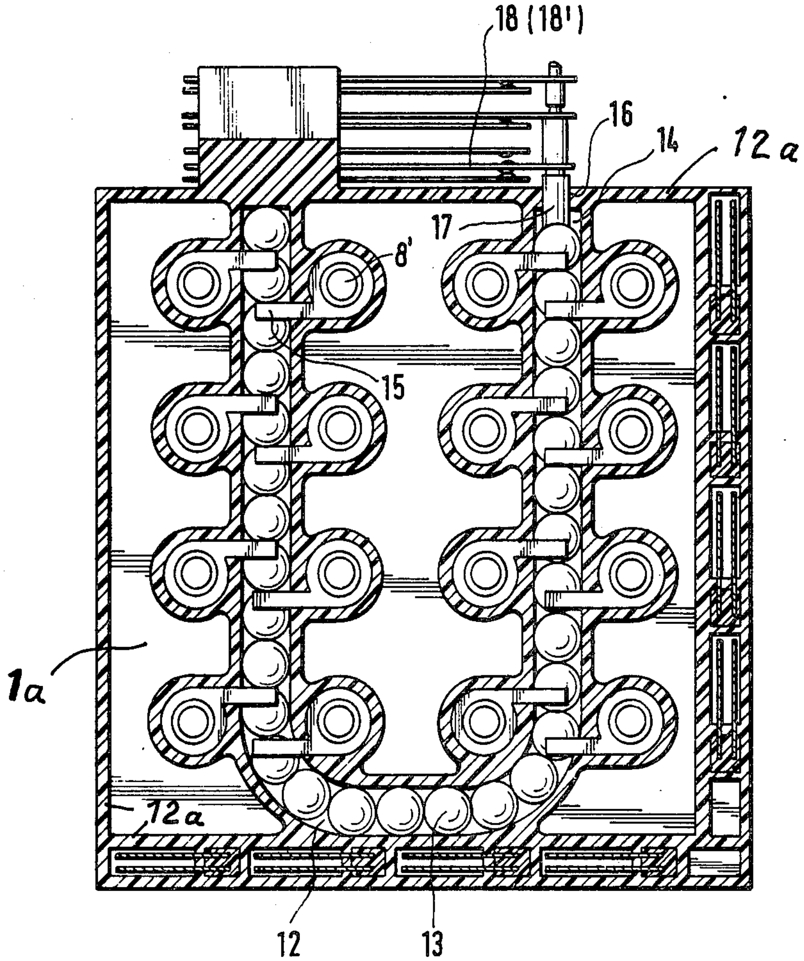
Figure 4:
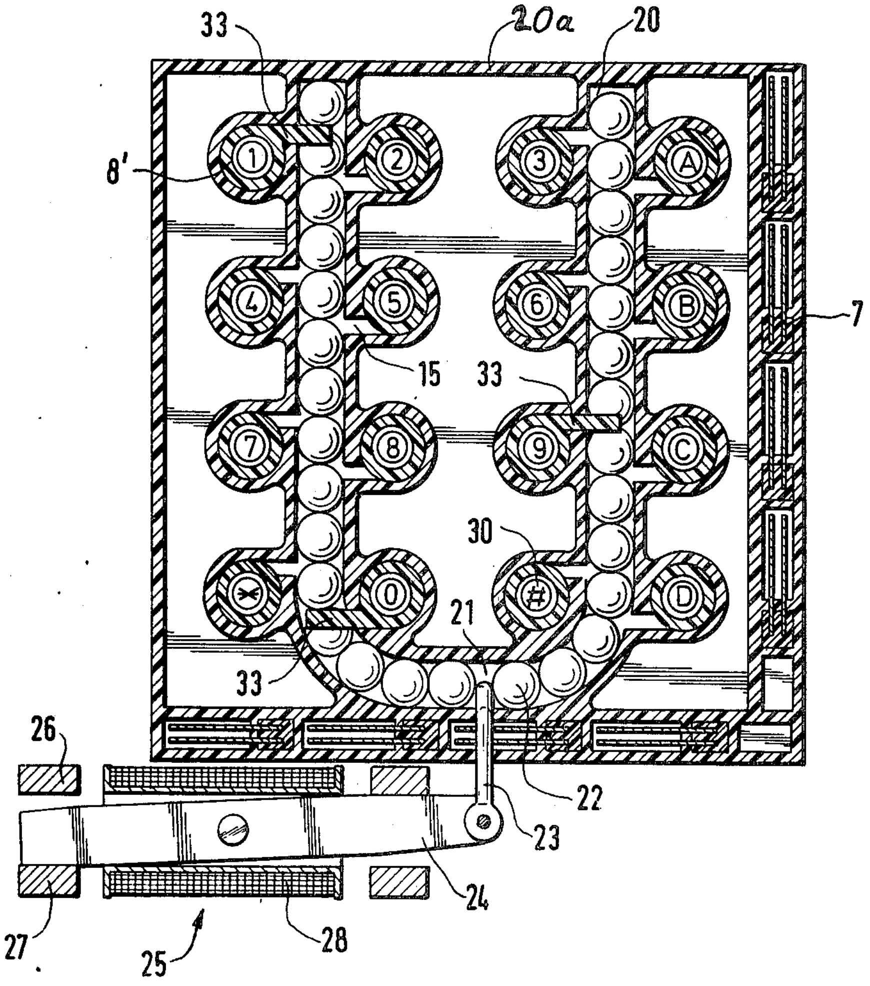
Figure 5:
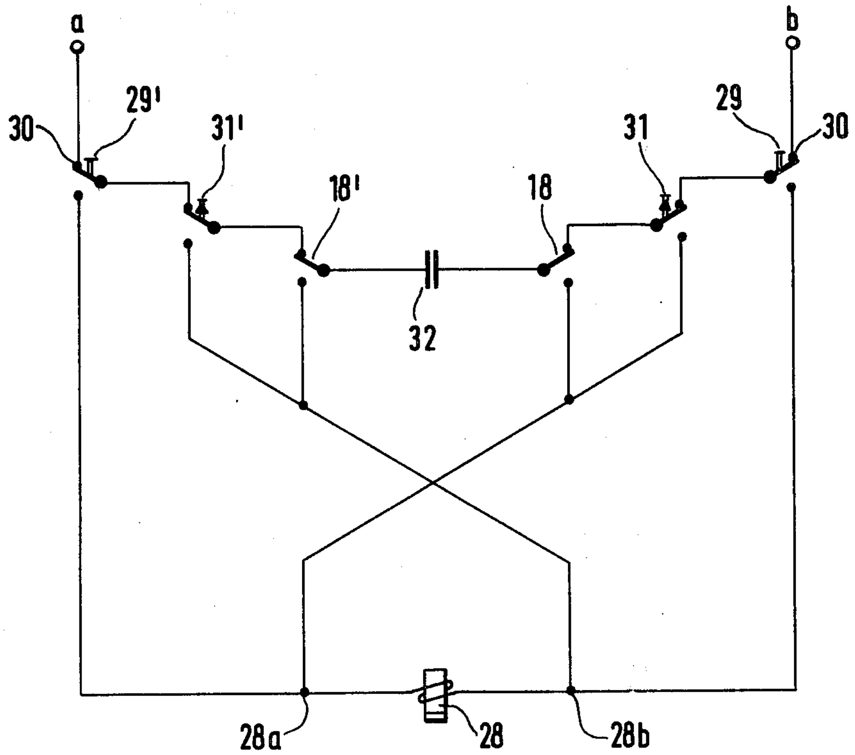
FIG. 5 is a circuit diagram for connection of the actuating device shown in FIGS. 1 and 4.

FIG. 5 illustrates a circuit diagram for operating the electromagnetic actuator 25 and the pin 23. The terminals of relay coil 28 are noted 28*a* and 28*b*, and they are connected as follows. Terminal 28*a* is connected (a) to a contact of the set 18 being actuated by the pin 17 (FIG. 3); (b) to a contact to be connected to a contact blade 29' upon pressing of a grounding key; and (c) to a contact that may engage a contact 31. Analogously, terminal 28*b* is connected to a contact of the set 18' also being actuated by the pin 17; (b) to a contact to be connected to a contact 29 upon pressing of that same grounding key; and (c) to a contact that may engage a key operated contact 31'. The contacts 29, 29', 31, 31', can be considered part of an initialization or primary trigger circuit which determines when a selected key blocking action is to take place, and when not. In the present example, contacts 31, 31', are operated by the hook or cradle switch of a telephone, and they have the illustrated position when the receiver handset has been lifted off the cradle. The contacts 31, 31', have the alternative position when the handset is on the cradle, thereby connecting a capacitor 32 to the terminals 28*a*, *b*, if the contacts 18, 18', have the illustrated position which is the case when pin 17 is retracted.

The alternative contacts 30 of the grounding key connect switching blades 29' and 29, respectively, to the telephone signal lines a and b. Blades 29' and 29 are always connected, respectively, to the alternative contacts engaging the blades 31', 31 for the lifted receiver or handset state. Blades 31, 31', connect in either case to the alternative contact of sets 18, 18', the latter connect to opposite sides of the capacitor 32. Whenever the handset is placed on the hook, contacts 31, 31', have the alternative position and do, in fact, connect terminals 28*a*, *b*, to the opposite sides of the capacitor as stated. This particular electromagnetic actuating system has the advantage that neither state requires continuously flowing current. It is pulse operated and the pulses are generated on location by charge and discharge of the capacitor 32 combined with control as to the direction of current flow.

The device, and here particularly the desired blocking for pressing certain keys operates as follows. As long as the handset is on the hook or cradle, pin 23 of the electromagnetic actuator 25 is retracted from duct 20, and the armature 24 has the alternative position as compared with the illustrated one in FIG. 4. As stated, contacts 31, 31', connect the capacitor 32 across the actuator coil 28, the capacitor is in effect discharged, but contacts 18, 18', 29, and 29', have the position as illustrated in FIG. 5.

As soon as the headset is removed, cradle contacts 31, 31' change to the illustrated position, and capacitor 32 is charged by the voltage difference between lines a and b. This is the first phase of the initialization and primary triggering function. Now, the grounding switch 30 must be pressed. This may be carried out, e.g., by the central operator, or may be carried out automatically after a particular delay. Pressing or operating switch 32 causes the capacitor 30 to be connected across the coil 28 through the connectors 18', 31' (now as illustrated), 29' (alternative position) to 28*a* on one side, and 18, 31 (alternative) to 28*b* on the other side. Thus, the capacitor 32 discharges via the coil 28, energizing the armature 34 to change to the position shown in FIG. 4. This is the second phase of the initialization and primary trigger function. It can thus be seen that following lifting of the handset, but prior to pressing any digit key of the board, pin 23 enters duct 20 (displacement space 21) and prevents any further displacement of the balls 22. Neither of the keys 1, 0 or 9 can now be depressed, as their pins 33 are not able to enter duct 20; they cannot displace any of the balls 22 in that duct because the pin 23 prevents such a displacement. All other keys of the board can be pressed because they lack a pin corresponding to the three pins 33.

After the key 30 has been released, coil 28 is separated from the capacitor 32 as contacts 29, 29' assume the illustrated position (FIG. 5), but the armature 24 retains the illustrated position (FIG. 4), because it is also a stable one, so that pin 23 still remains in duct 20. However, the capacitor 32 is reconnected to the lines a, b and recharges.

As any key other than 1, 0 or 9 is now pressed as the first digit key of a sequence, its locking arm 15 is placed between the balls 13 of duct 12 (FIG. 3) and displaces some of them to operate pin 17 which causes contacts 18, 18', to change position. Accordingly, capacitor 32 is again connected across coil 28, but in the opposite sense as before, so that the actuator 28 is energized at opposite polarity by a discharge of the capacitor 32. Now, armature 24 changes position and retracts the locking pin 23. As a consequence, the locking pin 23 is a normally retracted blocking element, being inserted in duct 20 only in the beginning of a data or digit entry sequence and is retracted again following keying-in of the first digit.

It can also be seen that the function just described is, in fact, the function of a transfer means which responds to the first (legal) key depressing and removes the blocking action as to certain keys. Therefore, the keys for digits 0, 1 and 9 are no longer blocked and can be actuated as a second or any other digit position, because the balls 22 can be displaced. Even key depression causes contacts 18, 18', to change position, but the energizing pulses for coil 28 merely re-enforce the alternative position for armature 24.

It will be appreciated that other positions for a multi-digit number may be blocked as to certain keys. This means that, for example, the blades 29, 29', are not actuated prior to the first key depression. Instead, blades 29, 29', 18 and 18', as per FIG. 5, are part of a toggle device which is triggered by a first displacement of plunger 17 to cause the blocking pin 23 to be inserted after the first key is pressed. After keying-in the second digit the pin 23 is retracted again.

Figure 6:
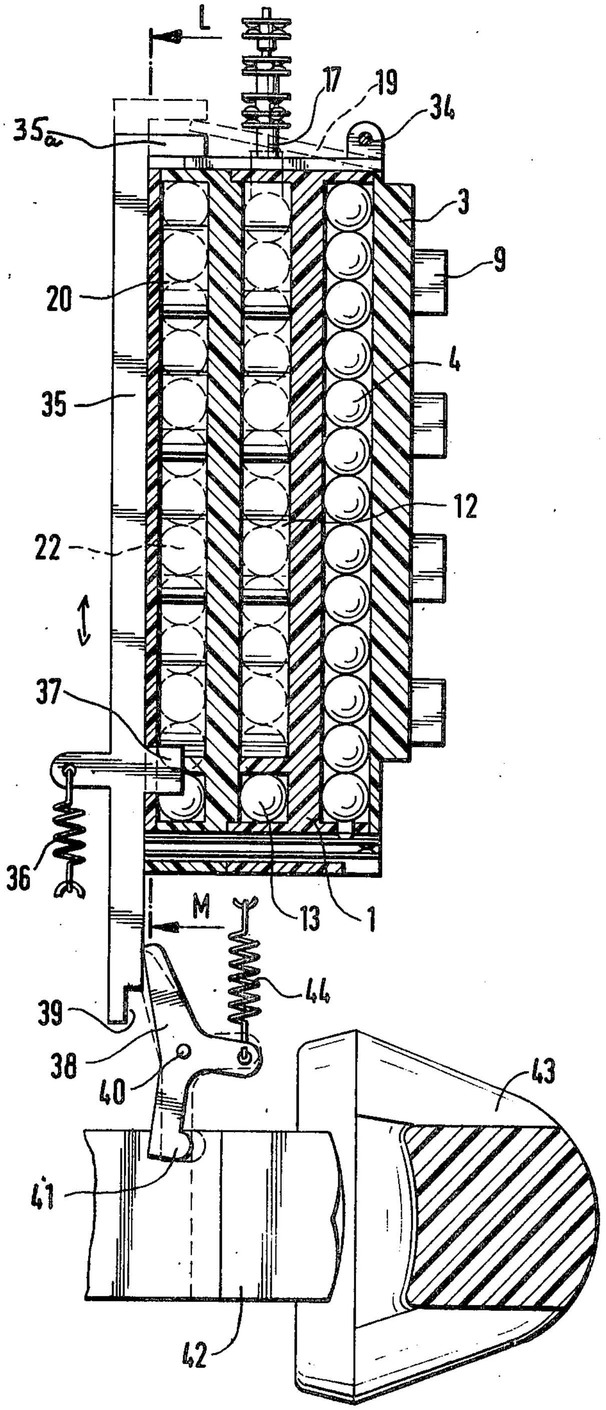
FIG. 6 is a cross-section of a keyboard similar to FIG. 1 but showing a mechanical actuator for the locking pin.
Figure 7:
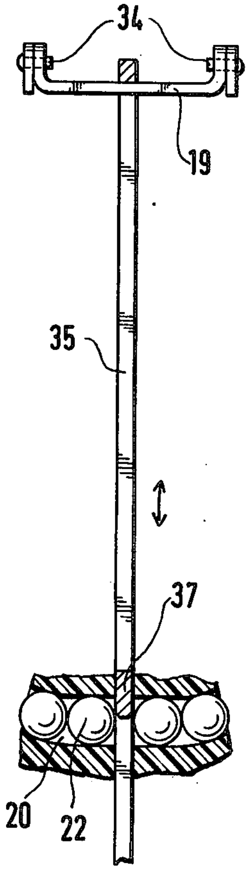
FIG. 7 is a longitudinal section view taken in a plane indicated by L, M in FIG. 6.
Figure 8:
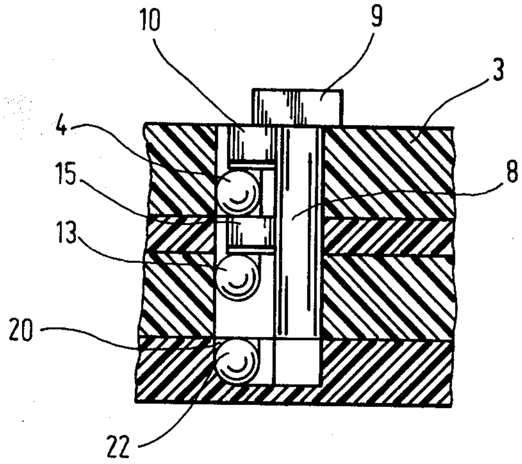
FIG. 8 is a section view of a part of the keyboard along lines G, H in FIG. 1.

FIGS. 6 and 7 illustrate a variation which does not affect the keyboard, nor the selection matrix (FIG. 2), nor the operation of the plunger 17 as it is operated by the balls in duct 12 (FIG. 3). Also, the duct 20 with balls 22 is provided to perform the blocking function for keys 0, 1 and 9, but the locking or blocking element is established here by a nose 37, replacing pin 23. Moreover, the arrangement is modified in that plunger 17 operates a one arm lever 19, and the nose 37 as replacing pin 23 extends from a slide 35, which is connected to other mechanical linkage elements. It can, thus, be seen that a mechanical actuation link is established between locking or blocking nose 37 and plunger or pin 17.

Turning now to further particulars, one end of lever 19 is pivotally linked to pivot points 34, and its other end engages a tongue 35*a* of slide 35. This slide 35 can be lifted when the pin 17 lifts the lever 19 up; tongue 35*a* is shown in dashed lines in that illustrated position.

Nose 37 is placed into the displacement space 21 of duct 20 to immobilize the balls 22 therein, whenever the slide is not lifted (solid drawn position of FIG. 6). This is the normal disposition of the slide with its nose 37 which, therefore, is normally inserted in the duct 20 for blocking action. Upon lifting of slide 35 by lever 19, nose 37 is removed for the duct 20 so that balls 22 can be displaced by any of the arms 33.

Slide 35 can be locked in the lifted position (nose 37 retraction) by a swivel latch 38 whose one arm drops into a recess 39 of slide 35. Latch 38 is pivoted at 40. A spring 44 causes that latch 38 to be shifted under the lifted slide 35. The spring tends to pivot the latch 38 in counterclockwise direction. The other arm of latch element 38 has a lug 41 which may engage the hook or cradle 42 of the telephone set. Reference numeral 43 refers to a handset. When the handset is lifted, spring 44 can turn the latch 38 (provided slide 35 is lifted). Upon replacing the handset 43 or pushing the cradle 42 down otherwise, latch 38 pivots so that it unlatches slide 35. Barring a lifted position of lever 19 slide 35 is now retracted into its resting position by operation of the spring 36.

This particular locking device operates as follows. As long as the handset 43 is on the cradle 42, latch 38 as well as slide 35 have the fully drawn illustrated position. This means that nose 37 blocks any displacement of balls 22, and the 0, 1 and 9 keys cannot be depressed. This situation is not changed when the receiver set 43 is lifted. Now, any of the other keyboard keys can be depressed; its arm 15 will enter duct 12 and causes balls 13 to lift pin 17 which will lift lever 19. Lifting of the lever 19 causes the slide 35 to be lifted against the force of return springs 36, and nose 37 is taken out of duct 20. As soon as the slide 35 has been sufficiently lifted, spring 44 pivots latch 38 to enter recess 39 and to hold the slide 35 in the lifted position. The slide 35 is now locked in a position in which the balls 22 are displaceable, unimpeded by nose 37, so that the 0, 1 and 9 keys can be operated thereafter.

It will be appreciated that the initialization and primary trigger function in this case does not require an initial entry of the locking element 37. Rather, the handset lifting releases the latch so that following the first digit entry, the slide 35 can be latched to release the blocking action for the selected digit keys.

As soon as the receiver 43 is replaced (or the cradle 42 is depressed otherwise) locking latch 38 is pivoted clockwise and releases the slide 35, which will fall back by operation of spring 36. Keys 0, 1 and 9 are again blocked from being operated next.

The invention is not limited to the embodiments described above but all changes and modifications thereof not constituting departures from the spirit and scope of the invention are intended to be included.

I claim:

1. In a keyboard having a plurality of keys which can be individually depressed, a construction for blocking the pressing of particular ones of the keys in a particular position in a series of key depressions, comprising:

duct means filled with a plurality of displacement bodies, the bodies being displaceable by a short distance in and along the duct means;

a locking element disposed for insertion in the duct means to prevent displacement of said bodies, said locking element upon retraction releasing the bodies for displacement;

actuating means coupled to the locking element for operating it and holding it in the inserted position during the particular position for key depressing;

a plurality of blocking arms respectively connected to the particular ones of the keys, said arms being respectively and individually permitted to enter the duct upon depressing one of the particular keys, provided the locking element is retracted, the arms of the particular keys preventing their being pressed when the locking element prevents displacement of the bodies; and transfer means being responsive to the pressing of other ones of the keys as the key being depressed in the particular position in the series of key depressions, to operate the actuating means for causing the locking element to retract from the blocking position.

2. In a keyboard as in claim 1, the actuator means having a first, normal operating state in which the locking element is retracted and a second operating state in which the locking element is inserted in the duct means, further including means for placing the actuating means from the first to the second state, prior to any key pressing for the particular position, said transfer means causing the actuator means to return to the first state.

3. In a key board as in claim 2, said actuating means comprising a bistable electromagnetic actuator for the locking element.

4. In a keyboard as in claim 3, said actuating means including a capacitor, said means for placing including a circuit for charging the capacitor, and for discharging the capacitor through the electromagnetic actuator for current flow in one direction for causing the locking element to be inserted, said circuit subsequently recharging the capacitor, said transfer means causing the capacitor to discharge through the electromagnetic actuator for current flow in the opposite direction to retract the locking element.

5. In a keyboard as in claim 1, said actuator means being an electromagnetic actuator, there being pulse means to operate the actuator, and circuit means included in the transfer means to operate the pulse means for causing the actuator to retract the locking element.

6. A keyboard as in claim 1 and in combination with and as part of a telephone and including means operated in response to a displacement of a cradle of the telephone to enable operation of the actuator means for retraction of locking element.

7. In a keyboard as in claim 6, and including a capacitor, and cradle displacement responsive means operating to charge the capacitor, said transfer means including switch means responsive to pressing of one of the other keys to cause the capacitor to discharge through the actuator, said actuator being an electromagnetic device, the capacitor discharges through the electromagnetic device.

8. In a keyboard as in claim 1, said actuator means having a normal operating state in which the locking element is inserted and a second operating state in which the locking element is retracted, said transfer means causing the actuator means to be placed into the second state.

9. In a keyboard as in claim 8, said actuating means being a mechanical element placing the locking element in the duct means, said transfer means releasing said mechanical element for retracting the locking element.

10. In a keyboard as in claim 9, including latch means for holding the mechanical element in the second state.

11. A keyboard as in claim 10 and in combination with and as a part of a telephone said latch means being coupled to a cradle of the telephone to be released upon pressing of the cradle.

12. In a keyboard as in claim 9, said mechanical element being a slide, the transfer means including a displacing pin and a lever operated by the pin to cause said slide to retract the locking element, the locking element extending from the slide.

13. In a keyboard as in claim 1, said transfer means including a second duct means also filled with a plurality of displacement bodies except for a short displacement space;

at least the keys other then the particular keys being provided with arms which respectively enter the second duct means for displacing at least some of the displacement bodies in the second duct means; and an actuating pin disposed to be operated by the displacement bodies in the second duct means and being operatively coupled to the actuating means to cause retraction of the locking element.

14. In a keyboard as in claim 13 including switching means operated by the pin and electrically controlling the actuating means, said actuating means being constructed as an electromagnetic actuator.

15. In a keyboard as in claim 13 wherein said pin operates the actuator means, the actuator means being constructed as a mechanical device coupled to the pin for being caused to be lifted by the pin thereby retracting the locking element.

* * * * *